C. B. Dickinson,
Slate Frame.
No. 100,501. Patented Mar. 8, 1870.
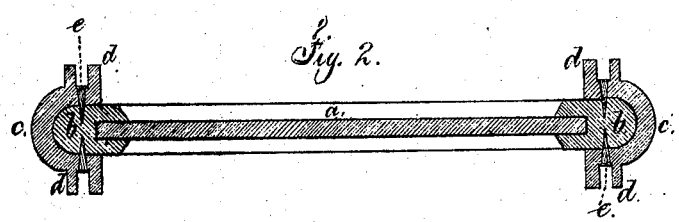
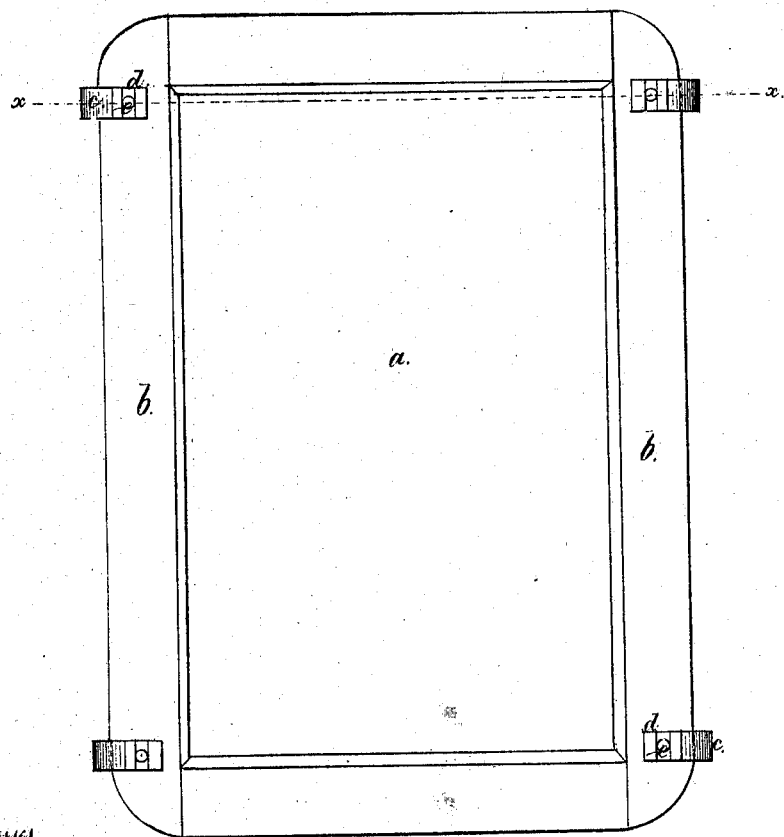
Witnesses
Chas. H. Smith
Geo. D. Walker.
C. B. Dickinson

United States Patent Office.

CHARLES B. DICKINSON, OF NEW YORK, N. Y.

Letters Patent No. 100,507, dated March 8, 1870.

IMPROVEMENT IN SLATE-FRAMES.

The Schedule referred to in these Letters Patent and making part of the same

*To all whom it may concern:*

Be it known that I, CHARLES B. DICKINSON, of the city and State of New York, have invented and made a new and useful Improvement in Slate-Frame Protectors, and the following is declared to be a correct description thereof.

My invention is designed to protect both the surface and the edge of the slate-frame by a piece of elastic material extending around from one side to the other, and having projecting fenders that prevent the head of the tack, by which the strip of elastic material is attached, from contact with the table or desk.

In the drawing—

Figure 1 represents a slate with the projectors applied thereto, and

Figure 2 is a section at the line x x.

The slate a, with its surrounding frame b, is to be of any usual or desired character.

The protectors c are made of strips of India rubber, having fenders d d projecting near the ends.

These protectors c and fenders d may be made in sheets or long strips, and cut up transversely, of the proper width, to form the said protectors c.

The ends of these protectors c are attached by tacks e inserted between the fenders d d, so that said fenders d prevent injury from the heads of the tacks.

A tack may be inserted near the middle of the protector and passing into the edge of the frame, and at this point the protector may be recessed for the head of the tack.

I do not claim a strip of India rubber or a rubber band passing partially around the slate-frame to cover wholly or partially the edges and surfaces of the frame.

What I claim is—

The protectors c, formed with the fenders d, contiguous to the heads of the tacks by which said protectors are attached upon the slate-frame, in the manner specified.

Dated December 6, A. D. 1869.

C. B. DICKINSON.

Witnesses:
  CHAS. H. SMITH,
  GEO. T. PINCKNEY.